(12) United States Patent
Pippin

(10) Patent No.: US 8,025,155 B2
(45) Date of Patent: Sep. 27, 2011

(54) HIGH DENSITY MAIL SORTING CART

(75) Inventor: James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 239 days.

(21) Appl. No.: 12/432,464

(22) Filed: Apr. 29, 2009

(65) Prior Publication Data
US 2009/0272859 A1 Nov. 5, 2009

Related U.S. Application Data

(60) Provisional application No. 61/049,576, filed on May 1, 2008.

(51) Int. Cl.
B07C 7/00 (2006.01)
B42F 17/00 (2006.01)
(52) U.S. Cl. ........... 209/630; 209/703; 211/12; 211/150
(58) Field of Classification Search .................. 209/630, 209/702, 703, 706, 707, 900, 942; 211/12, 211/150; 248/99
See application file for complete search history.

(56) References Cited

U.S. PATENT DOCUMENTS

| 862,243 | A | * | 8/1907 | Field | 211/12 |
|---|---|---|---|---|---|
| 870,835 | A | * | 11/1907 | Loew | 211/133.1 |
| 2,716,495 | A | * | 8/1955 | Prevette et al. | 211/186 |
| 3,527,360 | A | * | 9/1970 | Thielking | 211/150 |
| 4,763,799 | A | | 8/1988 | Cohn et al. | |
| 4,880,121 | A | * | 11/1989 | D'Elia | 209/702 |
| 4,984,704 | A | * | 1/1991 | O'Malley | 220/23.4 |
| 5,016,948 | A | | 5/1991 | Welch et al. | |
| 5,050,743 | A | * | 9/1991 | Lazzarotti | 211/12 |
| D323,915 | S | | 2/1992 | Welch | |
| D361,643 | S | | 8/1995 | Snell | |
| 5,472,097 | A | * | 12/1995 | Villachica | 209/546 |
| 5,690,209 | A | | 11/1997 | Kofoed | |
| 5,853,181 | A | * | 12/1998 | Booras | 280/47.35 |
| 5,944,201 | A | * | 8/1999 | Babboni et al. | 211/151 |
| 6,032,965 | A | * | 3/2000 | Sabounjian | 280/47.35 |
| 6,435,353 | B2 | * | 8/2002 | Ryan et al. | 209/706 |
| 6,715,614 | B2 | | 4/2004 | Pippin et al. | |
| 7,014,030 | B2 | * | 3/2006 | Hendzel et al. | 198/368 |
| 7,140,498 | B2 | * | 11/2006 | Pippin et al. | 211/12 |
| 7,540,385 | B2 | * | 6/2009 | Enenkel et al. | 209/630 |

(Continued)

OTHER PUBLICATIONS

Charnstrom, Charnstrom creating mail centers-organizing offices, Tote Cart Handles Heavy Loads, Part #:M279, www.charnstrom.com, Apr. 21, 2008, 1 page.

(Continued)

Primary Examiner — Joseph C Rodriguez

(57) ABSTRACT

A mail cart for use in manual sorting of mail pieces according to the inventions includes a generally rectangular frame and wheels mounted on the frame for rolling support of the cart on a floor. A bottom, substantially horizontal shelf is secured to the frame along with a first inclined shelf secured to the frame above the bottom shelf and spaced from the bottom shelf in a vertical direction, which first inclined shelf extends forwardly and upwardly at an acute angle relative to a horizontal plane. A second inclined shelf is secured to the frame above the first inclined shelf and spaced from the first inclined shelf in a vertical direction. The second inclined shelf extends forwardly and upwardly at an acute angle relative to a horizontal plane, which angle is preferably the same as the angle of first shelf.

11 Claims, 4 Drawing Sheets

U.S. PATENT DOCUMENTS

| | | |
|---|---|---|
| 7,878,358 B2 * | 2/2011 | Smudde .................... 220/23.88 |
| 2004/0051265 A1 | 3/2004 | Nadeau |
| 2004/0086367 A1 | 5/2004 | Isaacs |
| 2005/0100430 A1 | 5/2005 | Davidovic |
| 2007/0069489 A1 | 3/2007 | Kolpien |
| 2010/0140201 A1 * | 6/2010 | Andersen et al. ............. 211/150 |

OTHER PUBLICATIONS

Charnstrom, Charnstrom creating mail centers-organizing offices, 4-mailbag rack, Part #MB44, www.charnstrom.com, Apr. 21, 2008, 1 page.

* cited by examiner

HIGH DENSITY MAIL SORTING CART

This application claims priority of U.S. Provisional Application No. 61/049,576 filed May 1, 2008.

FIELD OF THE INVENTION

This invention relates to a cart and system for sorting of mail pieces such as flats and small parcels.

BACKGROUND OF THE INVENTION

Both federal postal services and private couriers face the challenge of sorting, handling and delivering mail pieces that are larger than letter size, such as parcels and flats. Tilt tray sorters and cross belt sorters are often the primary means for automated sorting of such mail pieces, but the output of such sorters often requires manual handling. Little has been done to facilitate such manual handling.

A typical tilt-tray or cross-belt sorter uses a series of carts mounting tilt tray or cross belt mechanisms. See for example Kofoed U.S. Pat. No. 5,690,209. The carts move around a generally oval shaped track or rail system that includes at least one induction area at which new items can be placed on a cart for sorting and a series of unloading zones at which the cart is activated to unload the item to a collection site usually outside of the track on which the carts move. The track is not a true oval but most often a rectangular shape with curved ends.

In connection with a commercial tray sorter known as the RSU tray sorter, the term "virtual sorter" was used to describe a tilt tray sorter with two or more induction points spaced along the perimeter of the oval track with multiple divert points (unloading areas) between induction points. The portion of the sorter that includes one induction point, its associated scanner, and the divert points between the induction point and the next induction point in the direction of travel of the sorter carts is considered one virtual sorter since within that segment the tray sorting machine performs all sorting functions along its length. A virtual sorter as the term is used herein has the foregoing meaning and may make use of any type of closed loop parcel sorting machine such as a cross-belt or tilt-tray sorter, or the equivalent.

Sorting systems such as cross-belt or tilt-tray sorters are often used to unload items to outlet chutes (also called collection chutes) from which items are manually taken and placed in containers or carts for subsequent processing. This operation is limited by the amount of space available around the periphery of the sorting machine's oval track. In one common version of this process, packages and flats are loaded into tubs on adjoining racks or into mail sacks mounted on carts. The carts are lined up in a formation surrounding the sorter. The human worker stands in an five to six foot wide aisle between the sorter track's outlet chutes and the carts or racks, which may be positioned both below the outlet chutes and on the other side of the aisle. The foregoing arrangement makes poor use of the available space. The present invention seeks to provide an improved cart for use with a closed loop parcel sorting machine permitting more efficient manual handling of sorted items.

A number of designs for mail carts and sorting racks are known, including those shown in U.S. Pat. No. 6,715,614 FIGS. 28 and 29. Bags can be described as having length, width and depth dimensions. The plastic bags shown in the '284 publication are oriented edgewise, such that the frontwardly opening mouths of the bags are oriented so that the widthwise dimension of the bag is oriented substantially vertically, presenting an opening that is long vertically and narrow horizontally. Mail carts according this publication use horizontally oriented shelves (FIG. 15) or shelves pitched from side to side (FIG. 19). The present invention takes a different approach to mail cart structure.

SUMMARY OF THE INVENTION

A mail cart for use in manual sorting of mail pieces according to the inventions includes a generally rectangular frame and wheels mounted on the frame for rolling support of the cart on a floor. A bottom, substantially horizontal shelf is secured to the frame along with a first inclined shelf secured to the frame above the bottom shelf and spaced from the bottom shelf in a vertical direction, which first inclined shelf extends forwardly and upwardly at an acute angle relative to a horizontal plane. A second inclined shelf is secured to the frame above the first inclined shelf and spaced from the first inclined shelf in a vertical direction. The second inclined shelf extends forwardly and upwardly at an acute angle relative to a horizontal plane, which angle is preferably the same as the angle of first shelf.

In preferred forms of the invention, the mail cart has a mechanism for releasably holding open bags placed on the first and second inclined shelves so that mouths of the bags open in a frontward direction of the cart and are oriented depthwise (not edgewise). The first and second inclined shelves are secured to the frame by pivots, and a mechanism such as a tether is provided for setting the angle at which the first and second inclined shelves extend, which angle changes by movement of the first and second inclined shelves about the pivots.

In use a first pair of bags are supported side by side on the first inclined shelf with mouths of the bags facing frontwardly, and a second pair of bags are supported side by side on the second inclined shelf with mouths of the second bags facing frontwardly, the first and second bags defining vertically offset rows of bags oriented at the inclination of the first and second shelves. A row of upwardly opening tubs stand side by side on the bottom shelf. Most preferably the first and second shelves are open in both frontward and rearward directions enough to permit removal of bags from the front or back of the cart.

The invention further provides a system or work cell for enabling manual sorting items to one of several designated areas associated with delivery destinations. A "mail item" according to the invention is a destination address-labeled, sortable parcel or flat, and does not include individual pieces of letter mail.

A "work cell" of the invention configured for manual sorting of flats and parcels includes a pair of mail carts as described above. The first cart is positioned beneath the outlet chute of a sorting machine with the rows of bags opening forwardly, and the second cart is positioned in an opposing position to the first cart spaced in a horizontal direction therefrom forming an aisle between the first and second carts so that a human worker standing in the aisle can unload items from the chute to any of the bags and tubs of the first and second carts. As the foregoing indicates, the invention also contemplates a method of sorting mail items which includes sorting mail items to discharge chutes of a parcel sorting machine and manually sorting items from the chute to the bags and tubs mounted on the cart or carts. These and other aspects of the invention are discussed in the detailed description that follows.

BRIEF DESCRIPTION OF THE DRAWING

In the accompanying drawings, wherein like numerals indicate like elements.

DETAILED DESCRIPTION

Figure 1:
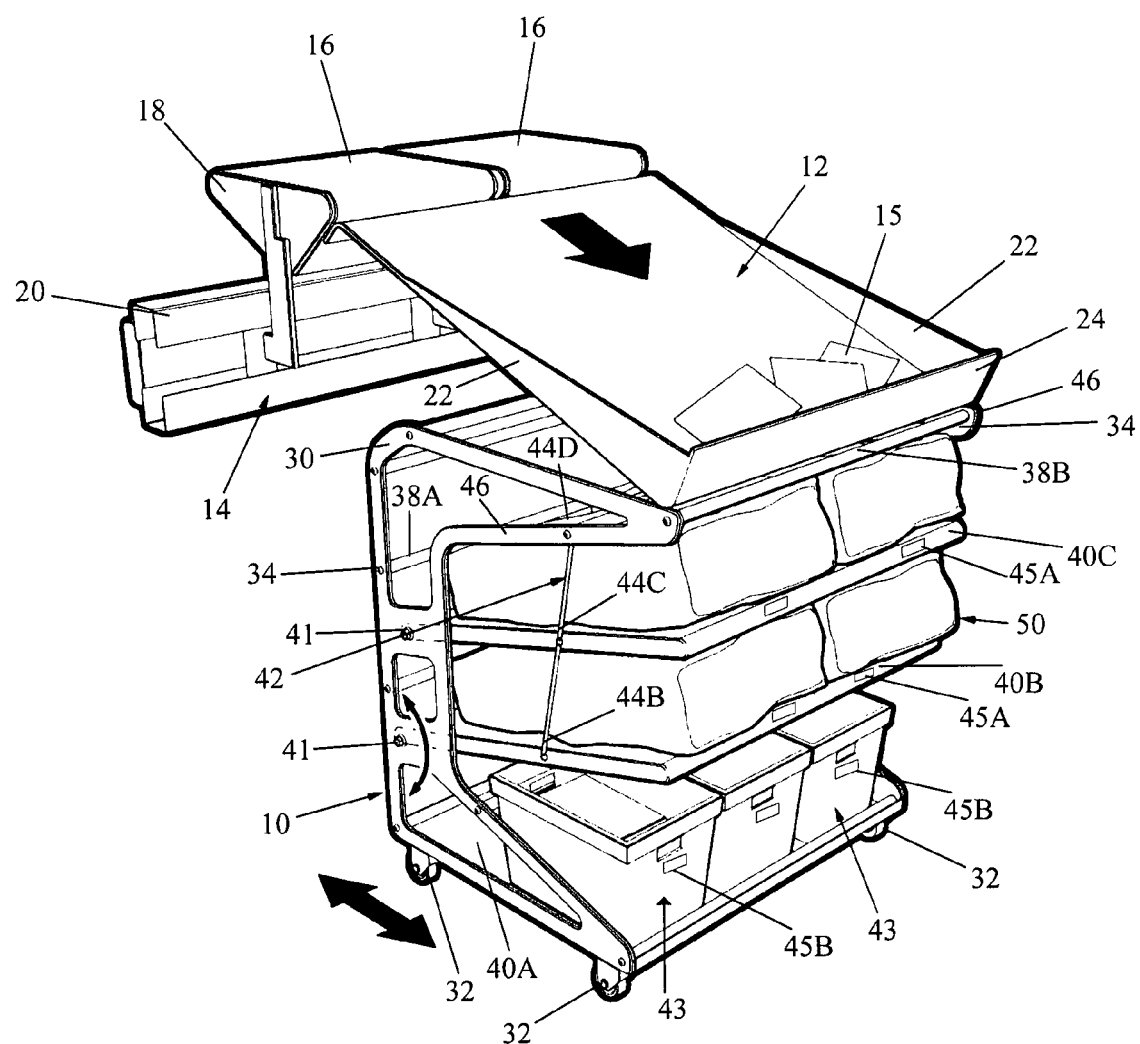
FIG. 1 is a front perspective view of a cart according to the to the invention.

Referring to FIG. 1, a mail sorting cart 10 according to the invention is positioned below a collector chute 12 of an adjacent cross belt sorter 14. Items 15 are discharged by belts 16 mounted on a carriage 18 that moves along the rail 20 of the sorter 14. Items 15 slide down a stationary chute 12 and are held at its front end by sidewalls 22 and front end wall 24.

Cart 10 includes a metal frame 30 mounted on wheels or casters 32 at its bottom corners. Frame 30 is made from a pair of symmetrical, frontwardly opening C-shaped side panels 34 that are united by a series of rear horizontal crossbars 38A vertically spaced along the rear of cart 10. In the event that to permit removal of bags from the rear of the cart is desired, intermediate crossbars 38A are relocated or omitted from the positions shown. Upper front corners of side panels 34 are united by a front crossbar 38B which fits just below the chute 12 of the sorting machine. Crossbar 38B is mounted at opposite ends to a pair of upper frontwardly extending arms 46 of panels 34. A horizontal bottom shelf 40A has sufficient width and depth so that several (three or more) flats tubs 43 fit side by side.

A pair of intermediate shelves 40B and 40C are secured by pivots 41 at rear corners to side panels 34 on both sides. A pair of tethers 42 (e.g. cords) are secured to points of attachment (posts or holes) 44B, C centrally located along the outer edge of each of shelves 40B, 40C, and 44D along arms 46 of panels 34. Middle hole 44C is offset forwardly relative to hole 44B, and hole 44D is offset forwardly relative to hole 44C. In the position shown in FIG. 1, tethers 42 thereby suspend shelves 40B, 40C tilted upwardly at pivots 41 at an acute angle such as from 15 to 45 degrees relative to a horizontal plane. If tethers 42 comprise chains and a link of the chain is mounted over a post at each point of attachment 44, then the angle at which shelves 40B, 40C protrude can be manually adjusted by repositioning the chains on the posts. Rigid tie rods could also be used as tethers 42.

A set of bags 50 are supported on shelves 40B, 40C with the mouth 52 of each bag opening forwardly. Conventional mail sacks can be used as bags 50.

Figure 2:
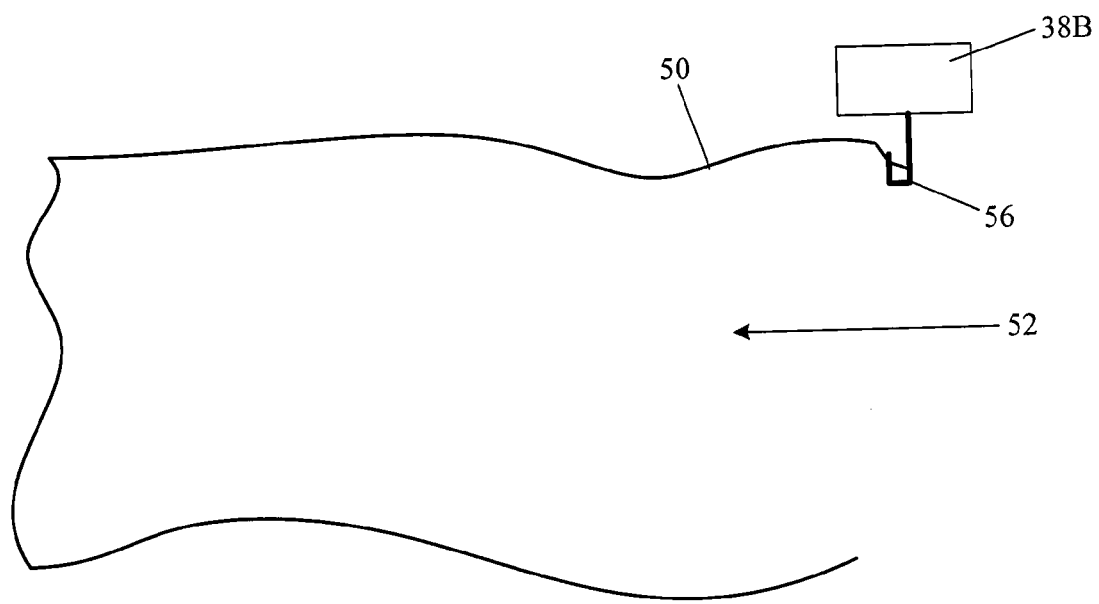
FIG. 2 is a side view of a bag of FIG. 1 mounted on hooks.

In the embodiment shown, each shelf 44B,C supports a pair of bags 50 side by side for a total of four as shown. Due to the angle at which shelves 44B,C extend, each bag can have greater length and hold more mail than if the shelves and bags were arranged horizontally or vertically, other dimensions remaining the same. To secure bags 50 and keep the mouth 52 of each bag 50 open, suitable means should be provided. As shown in FIG. 2, for conventional mail sacks have holes reinforced with metal eyelets 54 near the edge of mouth 52, hooks 56 attached to and crossbar 33 or panels 34 are inserted through eyelets 54 to hold mouth 52 open. For the bags in the lower row resting on shelf 40B, hooks 56 can depend from the front underside of shelves 40C. Hooks 56 are provided at intervals along the upper front edge of bag mouth 52, which intervals fit the spacing of the holes and eyelets 54 in the bag.

Figure 3:
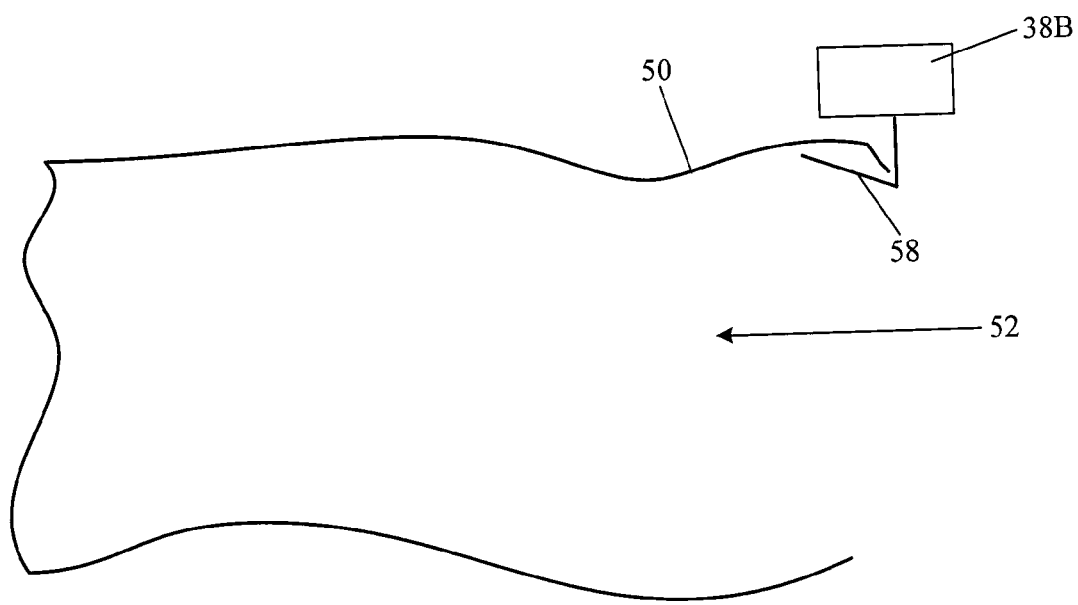
FIG. 3 is a side view of an alternative bag mounting system for the cart shown in FIG. 1.

FIG. 3 shows an L-shaped, inwardly directed, upwardly inclined flange 58 in place of hooks 56. Flange 58 extends along all or a major portion of the width of bag 50. The outside edge of the bag 50 is pulled over flange 58 to hold bag 50 open. Another such flange may be provided along the lower edge of the bag if needed. The bag holding and tensioning system described in Pippin et al. U.S. Pat. No. 6,715,614, incorporated by reference herein, FIGS. 28-31, can also be used if reoriented. As shown in FIG. 1, mail bags 50 when mounted for use on hooks 56 or otherwise are longer than they are wide or deep, and bag 50 is oriented widthwise so that mouth 52 is wider than in a horizontal direction it is deep vertically, such that the bag 50 lies flat on the shelf and is not suspended edgewise. The difference in orientation is very significant since bags 50 of the present invention are presented for access by human workers sorting small parcels, not letter mail. For this purpose the aspect ratio (width:depth) of mouth 52 is at least 2:1 when mounted as shown, and the width is at least 5 inches (13 cm). For a typical mail bag the bag length when laid flat as shown is 40 inches (102 cm).

Figure 4:
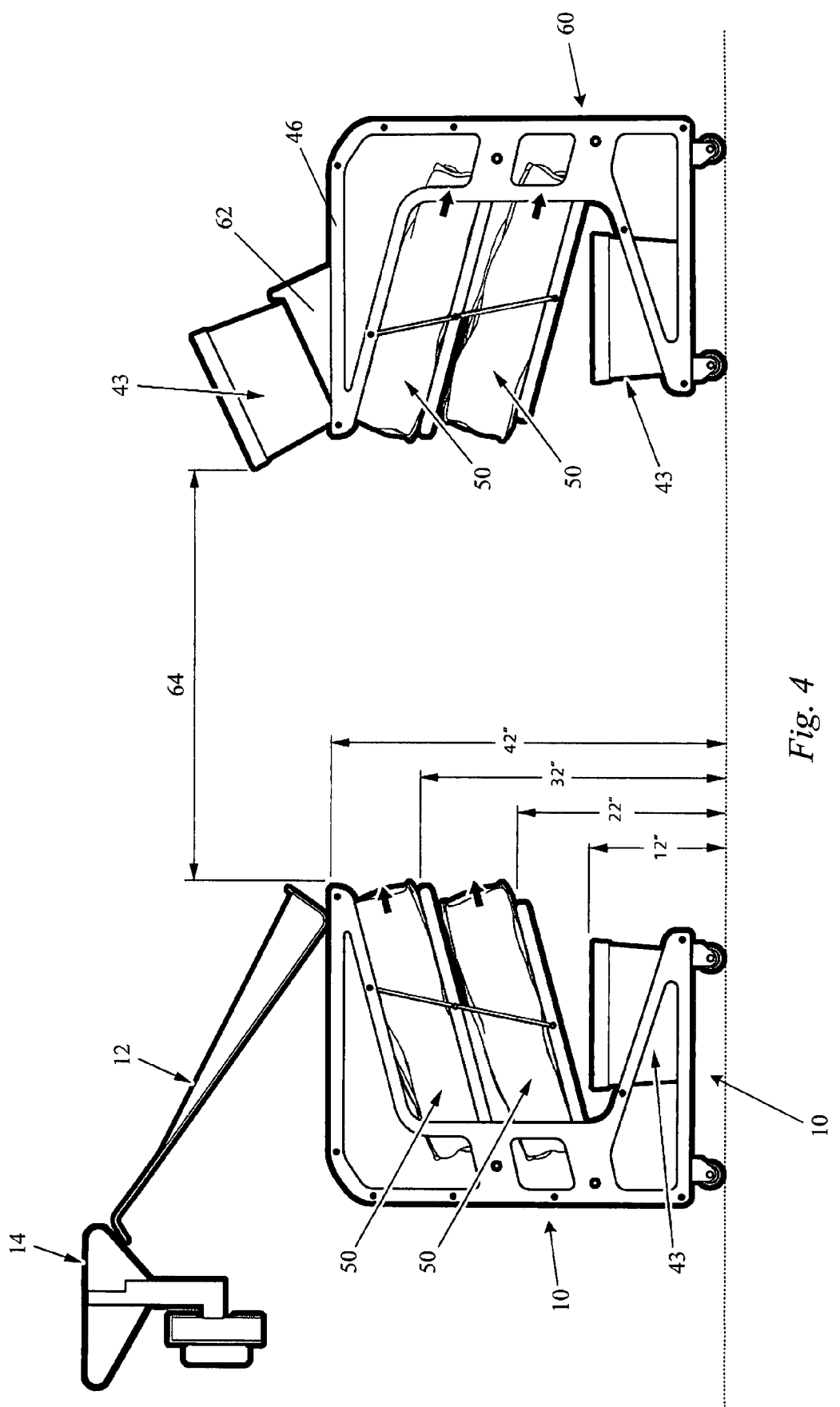
FIG. 4 is a side view of a pair of carts of the invention positioned in a manual sorting zone or work cell according to the invention.

Referring to FIG. 4, a work cell according to the invention includes one cart 10 positioned under a discharge chute 12 as described above. To obtain maximum benefit from the invention, the dimensions of cart 10 correspond to ergonomic limits. For example, the open tops of tubs 43 on bottom shelf 40A are preferably at least 12 inches from the facility floor vertically, and cart 10 is no more than 42 inches tall. In this embodiment the bottom edges of mouths 52 are 22 and 32 inches from the facility floor, respectively. The width of mouths 52 can vary but is preferably at least 6 inches when held open as described above.

A second cart 60 according to the invention stands about from 4 to 5 feet from cart 10 facing in the opposite direction so that carts 10 and 60 face one another and are aligned in a widthwise direction. Cart 60 is identical to cart 10 except that it has a forwardly sloping, frontwardly facing tub rack 62 on top of frame 30, preferably secured to arms 46 of panels 34. Rack 62 mounts three tubs 43 thereon in the same manner as lower shelf 40A but angled forwardly (an acute angle of 45° or less) for greater ease of access from the front of cart 60. An aisle 64 extends between carts 10, 60 and preferably separates them by a distance of from 4 to 5 feet.

Figure 5:
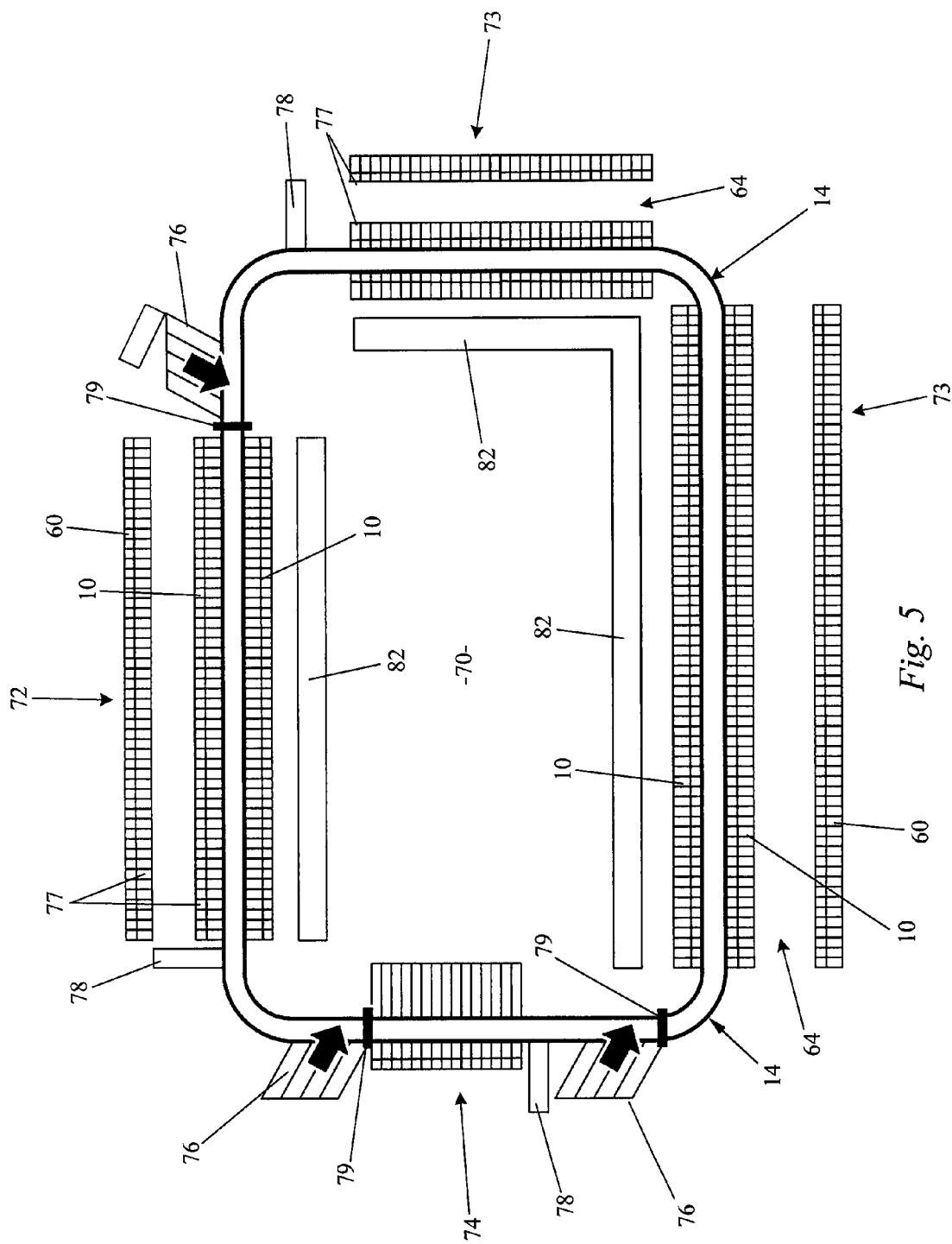
FIG. 5 is a schematic diagram of a sorting facility using closed loop parcel sorting machine and carts according to the invention.

FIGS. 4 and 5 illustrate how carts 10, 60 according to the invention can be used as part of a sorting facility 70 built around a cross belt sorter 14. Sorter 14 is divided into two virtual sorters 72 and 73 of unequal size and a section 74 for receiving outbound mail, that is items which will be shipped to another facility for delivery zone sorting. In section 74 there is no need for carts 10, 60 and mail pieces are sorted to chutes leading to containers or simple basket carts. For virtual sorters (sections) 72 and 73, the computerized sort scheme carried out by sorter 14 sorts inbound mail based on postal zones (5 digit zip codes in the U.S.A.). Each of virtual sorters 72, 73 has an automatic or manual induction station 76, a series of work cells 77 using carts 10, 60 of the invention, and a "jackpot" or reject bin 78 in which items that cannot be sorted in that virtual sorter are deposited. A reader 79 immediately downstream from each induction station 76 reads address information (such as in bar code form) from each mail piece as it passes so that it can be sorted to the correct work cell 77.

In the example shown, one or more human operators stand in aisles 64. As items are sorted to the chutes 12 facing the outside of the sorter track, human workers remove them and further sort them into one of bags 50 or tubs 43. The human uses sort information found on items 15 to locate a corresponding label 45A or 45B found on or by the respective sack or tub into which the item should be placed. Automated manual sorting aids may be also be provided, for example, the worker has a hand mounted bar code scanner that is connected via a wireless network to the central control computer of sorter 14. After scanning a bar code on a mail piece 15, an indicator tells the operator to place the item in one of sacks 1 to 4 or tubs 1, 2 or 3. Assignments on cart 60 may be the same or different as that used on cart 10. In particular, a flats tub #4 that corresponds to the same destination code as sack #4 may be presented on cart 60 along with destination assignments for mail sacks #'s 5,6,7, and 8, tubs 4, 5, 6 (bottom row) and tubs 7, 8 and 9 (if used) on rack 62 above.

A work cell 77 according to the invention may refer only to a pair of carts 10, 60 as shown in FIG. 4, or may refer to several pairs of carts 10, 60 adjacent one another, that is, a row of carts 10 on one side and an opposing row of carts 60 on the other side of aisle 64. The improved effectiveness of the carts of the invention allows a single operator to sort mail items from as many as ten pairs of carts 10, 60. Tilt tray and cross belt sorts are bi-directional, capable of discharging left or right. If space allows, the system can further include an additional row of carts 10 along the inside of the oval track 20 of the sorting machine 14 behind which are stationary racks 80 which can hold bags and tubs in the same manner a cart 60. If the sort scheme provides for bidirectional unloading, then the virtual sorters 72 and 73 include carts 10, 60 on both sides of the track 62 as well as racks 80. An "inside job" operator loads carts 10 and racks 80.

Once a sorting run is completed, carts 10, 60 can be rolled to an unloading area. Tubs 43 are removed and placed on transports or conveyors for further processing. Mail sacks 50 containing sorted mail pieces 15 are likewise removed from carts 10, 60 and taken away. For this purpose a sack 50 can be swept (removed from the cart) by releasing it from hooks 56 or the like and then pulling it up and out the front of the cart, or downwardly and out the back of the cart. Carts 10, 60 are thereafter refitted with empty bags 50 and tubs 43 and then returned to their positions about sorter 14 for another sorting run. Items sorted to outbound section 74 are removed and taken to a packing area for airmail shipment.

The mail bag and flats tub support system of the invention facilitates human reach limits while achieving higher container density compared to known carts. Container density in this context refers to the number of containers (sacks or tubs) of given dimensions that can fit on a rectangular cart or rack per lineal foot of cart width when compared to current commercial offerings. Higher density containers allow a reduction in the number of expensive automated outputs (in this case sorter chutes) which would otherwise be necessary to achieve the same number of splits or sort points in the given reach and space limits. For example, a conventional work cell presents 8 sacks and 3 flats tubs as compared to 8 to 11 sacks and 9 flats tubs per work cell using carts or racks according to the present invention. Parcels wider than the bag opening can still be placed into the bag because the bag holders which spread the sack face open are attached to a pivoting shelf. When the sides of the sack are forced open by a wide package, the shelf pivots, allowing the sack face to distort and accommodate abnormally large parcels. Typical sized parcels are more easily placed into the sack mouth/opening by virtue that the sack is being stretched and held open for minimal interference of the sack edges as the parcel is placed inside the sack. Increased work/sort cell density enables more outputs per comparable footprint and therefore more system configuration options, virtual segments, sort schemes and virtual sorter segment throughput.

Although the invention has been described with regards to a specific preferred embodiments thereof, variations and modifications will become apparent to those of ordinary skill in the art. For example, the items sorted could be trays or bags of postal mail, or small packages grouped together in a bag, rather than single parcels or flats as shown. The means for holding open the bag mouths could be a spacer that the operator puts into place at the time of cart setup or when needed. It is therefore the intent that the appended claims be interpreted as broadly as possible in view of the prior art as to include all such variations and modifications.

The invention claimed is:

1. A mail cart for use in manual sorting of mail pieces, comprising:
   a generally rectangular frame;
   wheels mounted on the frame for rolling support of the cart on a floor;
   a bottom, substantially horizontal shelf secured to the frame;
   a first inclined shelf secured to the frame above the bottom shelf and spaced from the bottom shelf in a vertical direction, which first inclined shelf extends forwardly and upwardly at an acute angle relative to a horizontal plane;
   a second inclined shelf secured to the frame above the first inclined shelf and spaced from the first inclined shelf in a vertical direction, which second inclined shelf extends forwardly and upwardly at an acute angle relative to a horizontal plane; and
   a holding mechanism configured to secure bags placed on the first and second inclined shelves and to releasably hold open mouths of the bags so that the mouths of the bags open in a frontward direction of the cart and are oriented depthwise.

2. The mail cart of claim 1, wherein the first and second shelves are open in both frontward and rearward directions enough to permit removal of bags from the front or back of the cart.

3. The mail cart of claim 1, wherein the first and second inclined shelves are secured to the frame by pivots, and further comprising a mechanism for setting the angle at which the first and second inclined shelves extend, which angle changes by movement of the first and second inclined shelves about the pivots.

4. The mail cart of claim 3, wherein the mechanism for setting the angle holds the first and second inclined shelves at the same acute angle.

5. A mail cart for use in manual sorting of mail pieces, comprising:
   a generally rectangular frame;
   wheels mounted on the frame for rolling support of the cart on a floor;
   a bottom, substantially horizontal shelf secured to the frame;
   a first inclined shelf secured to the frame above the bottom shelf an spaced from the bottom shelf in a vertical direction, which first inclined shelf extends forwardly and upwardly at an acute angle relative to a horizontal plane;
   a second inclined shelf secured to the frame above the first inclined shelf and spaced from the first inclined shelf in a vertical direction, which second inclined shelf extends forwardly and upwardly at an acute angle relative to a horizontal plane, wherein the first and second inclined shelves are secured to the frame by pivots;
   a mechanism for setting the angle at which the first and second inclined shelves extend, which angle changes by movement of the first and second inclined shelves about the pivots, wherein the mechanism for setting the mole holds the first and second inclined shelves at the same acute angle and wherein the mechanism for setting the angle comprises a tether connected at points of attachment to side edges of the first and second inclined shelves and to the frame;

a holding mechanism for releasably holding open bags placed on the first and second inclined shelves so that mouths of the bags open in a frontward direction of the cart and are oriented depth-wise.

6. The mail cart of claim 5, wherein the tether extends at a forwardly inclined angle.

7. A mail cart for use in manual sorting of mail pieces, comprising:

a generally rectangular frame;

wheels mounted on the frame for rolling support of the cart on a floor;

a bottom, substantially horizontal shelf secured to the frame;

a first inclined shelf secured to the frame above the bottom shelf and from the bottom shelf in a vertical direction, which first inclined shelf extends forwardly and upwardly at an acute angle relative to a horizontal plane;

a second inclined shelf secured to the frame above the first inclined shelf and spaced from the first inclined shelf in a vertical direction, which second inclined shelf extends forwardly and upwardly at an acute angle relative to a horizontal plane;

a holding mechanism for releasably holding open bags placed on the first and second inclined shelves so that mouths of the bags open in a frontward direction of the cart and are oriented depthwise;

a first pair of bags supported side by side on the first inclined shelf with mouths of the bags facing frontwardly, and a second pair of bags supported side by side on the second inclined shelf with mouths of the second bags facing frontwardly, the first and second bags defining vertically offset rows of bags oriented at the inclination of the first and second shelves; and a row of upwardly opening tubs side by side on the bottom shelf.

8. The mail cart of claim 7, wherein the aspect ratio (width: depth) of each bag mouth is at least 2:1 when held by the holding mechanism.

9. A work cell configured for manual sorting of flats and parcels, comprising a pair of mail carts for use in manual sorting of mail pieces, each cart comprising:

a generally rectangular frame;

wheels mounted on the frame for rolling support of the cart on a floor;

a bottom, substantially horizontal shelf secured to the frame;

a first inclined shelf secured to the frame above the bottom shelf and spaced from the bottom shelf in a vertical direction, which first inclined shelf extends forwardly and upwardly at an acute angle relative to a horizontal plane;

a second inclined shelf secured to the frame above the first inclined shelf and spaced from the first inclined shelf in a vertical direction, which second inclined shelf extends forwardly and upwardly at an acute angle relative to a horizontal plane;

a first pair of bags supported side by side on the first inclined shelf with mouths of the bags facing frontwardly;

a second pair of bags supported side by side on the second inclined shelf with mouths of the second bags facing frontwardly, the first and second bags defining vertically offset rows of bags oriented at the inclination of the first and second shelves;

a row of upwardly opening tubs side by side on the bottom shelf;

a mechanism for releasably holding open bags placed on the first and second inclined shelves so that mouths of the bags open in a frontward direction of the cart and are oriented depthwise; and wherein the first cart is positioned beneath a discharge chute of a sorting machine with the rows of bags opening forwardly, and the second cart is positioned in an opposing position to the first cart spaced in a horizontal direction therefrom forming an aisle between the first and second carts so that a human worker standing in the aisle can unload items from the chute to any of the bags and tubs of the first and second carts.

10. The work cell of claim 9, wherein the work cell includes a row of first carts side by side beneath the discharge chute and a row of second carts facing the row of first carts with the aisle between the rows of carts.

11. The work cell of claim 9, wherein the second cart has a top rack on which additional tubs for receiving mail items are positioned, the second cart being taller than the first cart.

* * * * *